US008047079B2

(12) United States Patent
Bleys et al.

(10) Patent No.: US 8,047,079 B2
(45) Date of Patent: Nov. 1, 2011

(54) METHOD FOR CONTROLLING AN ELECTRONIC PRESSURE GAUGE AND PRESSURE GAUGE THEREFOR

(75) Inventors: Christian Bleys, Cerans-Foulletourte (FR); Fabrice Pin, Viroflay (FR); Philippe Deck, Montreuil (FR)

(73) Assignee: L'Air Liquide Societe Anonyme pour l'Etude et Exploitation des Procedes Georges Claude, Paris (FR)

( * ) Notice: Subject to any disclaimer, the term of this patent is extended or adjusted under 35 U.S.C. 154(b) by 51 days.

(21) Appl. No.: 12/597,864

(22) PCT Filed: Mar. 27, 2008

(86) PCT No.: PCT/FR2008/050537

§ 371 (c)(1), (2), (4) Date: Oct. 27, 2009

(87) PCT Pub. No.: WO2008/139075

PCT Pub. Date: Nov. 20, 2008

(65) Prior Publication Data

US 2010/0132474 A1 Jun. 3, 2010

(30) Foreign Application Priority Data

May 3, 2007 (FR) ........................................ 0754840

(51) Int. Cl.
*G01L 7/18* (2006.01)

(52) U.S. Cl. ................................ 73/749; 73/714; 73/717

(58) Field of Classification Search ......................... None
See application file for complete search history.

(56) References Cited

U.S. PATENT DOCUMENTS

| | | | |
|---|---|---|---|
| 3,490,267 | A | 1/1970 | Gordon |
| 4,147,893 | A | 4/1979 | Matson |
| 4,420,748 | A | 12/1983 | Jurgen |
| 4,734,688 | A | 3/1988 | Adams |
| 4,838,089 | A | 6/1989 | Okada et al. |
| 5,016,483 | A | 5/1991 | Budinger |
| 5,159,839 | A | 11/1992 | Silber et al. |
| 5,379,637 | A | 1/1995 | Abowd et al. |
| 5,440,477 | A | 8/1995 | Rohrberg et al. |
| 5,566,713 | A | 10/1996 | Lhomer et al. |
| 5,648,765 | A | 7/1997 | Cresap et al. |
| 5,738,145 | A | 4/1998 | Daicho et al. |
| 6,137,417 | A | 10/2000 | McDermott |
| 6,182,713 | B1 | 2/2001 | Deck et al. |
| 6,229,448 | B1 | 5/2001 | Bennett, Jr. et al. |

(Continued)

FOREIGN PATENT DOCUMENTS

CA 2 425 851 10/2003

(Continued)

OTHER PUBLICATIONS

International Search Report for PCT/FR2008/050537.

(Continued)

*Primary Examiner* — Andre J Allen
(74) *Attorney, Agent, or Firm* — Elwood L. Haynes

(57) ABSTRACT

The invention provides a method for controlling an electronic manometer for measuring pressure (p) inside a pressurized gas receptacle. The manometer comprises at least one pressure sensor, an electronic unit designed for the acquisition, storage and processing of data, and at least one information device device capable of transmitting at least one item of information (p).

27 Claims, 1 Drawing Sheet

U.S. PATENT DOCUMENTS

| | | | |
|---|---|---|---|
| 6,672,151 B1 | 1/2004 | Schultz et al. | |
| 6,789,126 B1 | 9/2004 | Saulpaugh et al. | |
| 7,104,124 B2 | 9/2006 | Stabile et al. | |
| 2001/0045892 A1 | 11/2001 | Thomas et al. | |
| 2002/0170347 A1 | 11/2002 | Stabile et al. | |
| 2003/0229603 A1 | 12/2003 | Childress et al. | |
| 2004/0041709 A1 | 3/2004 | Forster | |
| 2004/0045608 A1 | 3/2004 | Peters et al. | |
| 2004/0187095 A1 | 9/2004 | Gilfix et al. | |
| 2005/0083198 A1 | 4/2005 | Bulin et al. | |
| 2005/0210990 A1 | 9/2005 | Hayashi et al. | |
| 2005/0274166 A1 | 12/2005 | Wu et al. | |
| 2006/0011475 A1 | 1/2006 | Lin et al. | |
| 2006/0243347 A1 | 11/2006 | Humphrey | |
| 2009/0040049 A1 | 2/2009 | Delecourt et al. | |
| 2010/0131213 A1* | 5/2010 | Bleys et al. | 702/50 |
| 2010/0132437 A1 | 6/2010 | Bleys et al. | |

FOREIGN PATENT DOCUMENTS

| | | |
|---|---|---|
| DE | 40 09 741 | 10/1991 |
| DE | 101 46 457 | 4/2003 |
| DE | 20 2004 000564 | 4/2004 |
| DE | 10 2006 008427 | 10/2006 |
| EP | 0 180 662 | 5/1986 |
| EP | 0 292 606 | 11/1988 |
| EP | 0 451 897 | 10/1991 |
| EP | 0 486 922 | 5/1992 |
| EP | 0 534 876 | 3/1993 |
| EP | 0 733 889 | 9/1996 |
| EP | 0 860 354 | 8/1998 |
| EP | 0 863 794 | 9/1998 |
| EP | 0 916 891 | 5/1999 |
| EP | 0 982 121 | 3/2000 |
| EP | 1 055 862 | 11/2000 |
| EP | 1 126 202 | 8/2001 |
| EP | 1 145 740 | 10/2001 |
| EP | 1 191 276 | 3/2002 |
| EP | 1 760 640 | 3/2007 |
| EP | 0 813 022 | 12/2007 |
| EP | 1 936 255 | 6/2008 |
| EP | 1 988 327 | 11/2008 |
| FR | 2 391 455 | 12/1978 |
| FR | 2 504 650 | 10/1982 |
| FR | 2 723 202 | 2/1996 |
| FR | 2 776 763 | 10/1999 |
| FR | 2 814 794 | 4/2002 |
| FR | 2 863 037 | 6/2005 |
| FR | 2 868 160 | 9/2005 |
| FR | 2 901 873 | 12/2007 |
| FR | 2 901 874 | 12/2007 |
| FR | 2 901 875 | 12/2007 |
| FR | 2 901 876 | 12/2007 |
| FR | 2 910 591 | 6/2008 |
| FR | 2 915 798 | 11/2008 |
| FR | 2 915 799 | 11/2008 |
| FR | 2 915 800 | 11/2008 |
| FR | 2 915 801 | 11/2008 |
| FR | 2 915 821 | 11/2008 |
| GB | 1 319 764 | 6/1973 |
| GB | 2 098 758 | 11/1982 |
| GB | 2 189 887 | 11/1987 |
| GB | 2 236 839 | 4/1991 |
| GB | 2 274 331 | 7/1994 |
| GB | 2 415 072 | 12/2005 |
| IL | 100035 | 11/1994 |
| WO | WO 91 18266 | 11/1991 |
| WO | WO 98 05415 | 2/1998 |
| WO | WO 99 40553 | 8/1999 |
| WO | WO 01 69340 | 9/2001 |
| WO | WO 2004 053450 | 6/2004 |
| WO | WO 2005 093377 | 10/2005 |
| WO | WO 2006 065704 | 6/2006 |
| WO | WO 2006 074417 | 7/2006 |
| WO | WO 2007 138207 | 12/2007 |
| WO | WO 2007 138208 | 12/2007 |
| WO | WO 2008 139073 | 11/2008 |
| WO | WO 2008 139074 | 11/2008 |
| WO | WO 2008 139075 | 11/2008 |
| WO | WO 2008 139081 | 11/2008 |

OTHER PUBLICATIONS

French Search Report for related FR 2 868 160, Jan. 20, 2005.
International Search Report and Written Opinion for related PCT/FR2005/050177, Sep. 26, 2005.
French Search Report for related FR 2 901 873, Mar. 13, 2007.
International Search Report and Written Opinion for related PCT/FR2007/051229, Oct. 30, 2007.
French Search Report for related FR 2 901 874, Mar. 21, 2007.
International Search Report and Written Opinion for related PCT/FR2007/051230, Oct. 18, 2007.
French Search Report for related FR 2 901 875, Mar. 23, 2007.
French Search Report for related FR 2 901 876, Apr. 23, 2007.
European Search Report for related EP 07 30 1592, Jan. 18, 2008.
French Search Report for related FR 2 901 591, Jun. 13, 2007.
French Search Report for related FR 2 915 799, Jan. 9, 2008.
International Search Report and Written Opinion for related PCT/FR2008/050570, Dec. 4, 2008.
French Search Report for related FR 2 915 800, Sep. 21, 2007.
International Search Report and Written Opinion for related PCT/FR2008/050534, Sep. 9, 2008.
French Search Report for related FR 2 915 801, Sep. 25, 2007.
International Search Report and Written Opinion for related PCT/FR2008/050536, Sep. 9, 2008.
French Search Report for related FR 2 915 798, Sep. 24, 2007.
Written Opinion for related PCT/FR2008/050537, Sep. 26, 2008.
European Search Report for related EP 08 30 5103, Aug. 28, 2008.
French Search Report for related FR 2 901 821, Dec. 7, 2007.

* cited by examiner

METHOD FOR CONTROLLING AN ELECTRONIC PRESSURE GAUGE AND PRESSURE GAUGE THEREFOR

This application is a 371 of International PCT Application PCT/FR2008/050537, filed Mar. 27, 2008, the entire contents of which are incorporated herein by reference.

FIELD OF THE INVENTION

The present invention relates to a method for controlling an electronic manometer and a corresponding manometer.

The invention relates more particularly to a method for controlling an electronic manometer for measuring the pressure inside a receptacle, particularly a pressurized gas bottle, said manometer comprising at least one pressure sensor, an electronic unit designed for the acquisition, storage and processing of data and at least one information device capable of transmitting at least one item of information.

BACKGROUND

Such a manometer is described for example in document FR2868160A1.

Because they are reused many times, fluid bottles are successively faced with many cases of use with users who have different needs.

The information displayed or transmitted by the individual manometers measuring the pressure in the bottles are not adapted to the usage situations.

To solve this problem, such electronic manometers require many human interventions (actuation of buttons, sensors or other actuators). Because of this, such manometers have to provide means of actuation, interrogation or configuration which increase the structure and hence the cost of such devices. Moreover, the interventions on such electronic manometers may be the cause of operating errors and increase the electricity consumption of the manometer.

Document WO 01/6934 A1 describes a method for controlling the content of a liquefied gas bottle (propane) only during its use via a pressure sensor associated with electronics to indicate the level of product remaining as a function of pressure measurements compared with predefined thresholds.

One object of the present invention is to alleviate some or all of the drawbacks of the prior art listed above.

SUMMARY OF THE INVENTION

The present invention provides a method for controlling an electronic manometer for measuring the pressure (P) inside a pressurized gas receptacle. The manometer comprises at least one pressure sensor, an electronic unit designed for the acquisition, storage and processing of data, and at least one information device capable of transmitting at least one item of information (P). The method comprises at least one step of measuring the pressure (P) in the receptacle by the pressure sensor, a step of automatic modification of the operating mode of the manometer and/or the information (P) transmitted by the manometer in order to adapt the operating mode or the items of information (P) to the current operating state (A, B-C, D) of the receptacle from a plurality of predefined operating states (A, B-C, D), the operating states (A, B, C, D) being predefined by pre-established reference pressure-threshold values (S1 to S3), the operating states (A, B-C, D) being linked chronologically so as to form a chronological cycle, the modification step being carried out following the detection of a switchover from a first operating state (A, B-C, D) to a second operating state when the pressure values (P) measured during the first operating state and compared with the pre-established reference pressure-threshold values (S1 to S3) correspond to the second operating state and the second operating state is the next in the chronological cycle. With regard to the present method, the predefined operating states (A, B-C, D) are chronologically linked according to a closed-loop chronological cycle and the manometer is connected to the receptacle and is capable of measuring the pressure within the receptacle throughout the closed-loop chronological cycle.

DETAILED DESCRIPTION OF THE INVENTION

Figure 3:
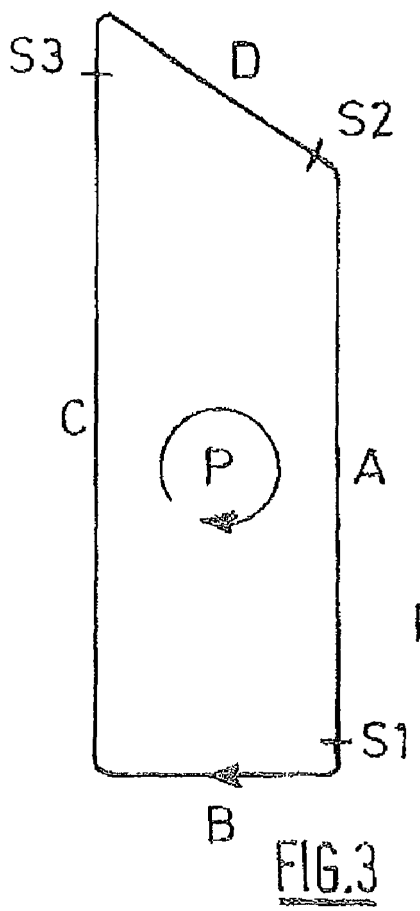
FIGS. 2 and 3 represent, respectively in the form of a graph and a closed curve, an example of a cycle of pressure change inside a gas bottle during a complete cycle of use.

The method according to the invention, moreover according to the generic definition given thereto in the above preamble, is essentially characterized in that it comprises:

- at least one step of measuring the pressure in the receptacle by the pressure sensor,
- a step of automatic modification of the operating mode of the manometer and/or the information transmitted by the manometer in order to adapt said operating mode or said items of information to the current operating state of the receptacle from a plurality of predefined operating states, said operating states being predefined by pre-established reference pressure-threshold values, said operating states being linked chronologically so as to form a chronological cycle,
- the modification step being carried out following the detection of a switchover from a first operating state to a second operating state, that is to say when the pressure values measured during the first operating state and compared with the pre-established reference pressure-threshold values correspond to the second operating state and the second operating state is the next in the chronological cycle.

The invention also relates to an electronic manometer for measuring the pressure inside a receptacle, particularly a pressurized gas bottle, comprising at least one pressure sensor, an electronic unit designed for the acquisition, storage and processing of data, at least one information device capable of transmitting at least one item of information, the electronic data processing unit being designed to receive the pressure values measured by the pressure sensor and comprising logic for comparing the measured pressure and measured pressure change values with pre-established or stored respective reference values, the electronic data processing unit storing at least two operating states of the receptacle representative respectively of a state of fill of the receptacle when the pressure change is positive and a state of tapping off (negative pressure change), as a function of the measured pressure and measured pressure change values relative to the pre-established pressure and pressure change reference values, and the electronic data processing unit being designed to automatically change the operation and/or the nature of the information transmitted by the manometer as a function of the operating state of the receptacle that is determined in real time based on the measured pressure and pressure change values.

Moreover, embodiments of the invention may comprise one or more of the following features:

the predefined operating states are chronologically linked according to a closed-loop chronological cycle, the succession of predefined operating states in a closed loop proceeds in a single direction, the method comprises at least two, and preferably at least three predefined operating states, the method comprises three operating states predefined by three distinct reference pressure-threshold values, when the measured pressure again descends below a first high threshold in order then to be between a first low threshold and said first high threshold, the electronic unit automatically switches the manometer to an operating state called "usage" during which the manometer carries out at least one of the following operating steps:

regular acquisition of the values measured by the pressure sensor at time intervals separated by a first acquisition frequency, electronic display of at least one item of information from: the measured pressure, a calculated volume remaining in the receptacle, a calculated period of autonomy in the receptacle, regular wireless transmission, of the microwave type, at a first transmission frequency, of at least one item of information from: the measured pressure, an item of autonomy information (volume or time remaining), when, during the operating state called "usage", the measured pressure variation decreases, the manometer carries out a regular calculation, at a first calculation frequency, of a remaining autonomy time in gas based on the change in measured pressure, when, during the operating state called "usage", the change in pressure is zero for a determined period, the electronic unit defines an operating state called "non-usage or no-flow" during which the manometer carries out at least one of the following operating steps:

regular acquisition of the values measured by the pressure sensor at time intervals separated by a second acquisition frequency, calculation of a period of autonomy remaining in gas based on a previous use of the receptacle or on the basis of a typical or standard predefined usage, electronic display of at least one item of information from: the measured pressure, a calculated volume remaining in the receptacle, a calculated period of autonomy in the receptacle, regular wireless transmission, of the microwave type, at a second transmission frequency, of at least one item of information from: the pressure measured at time intervals, an item of autonomy information (volume or time remaining), based on a state of usage, when the measured pressure becomes less than the first low threshold, the electronic unit detects or defines an operating state called "fill" during which the manometer carries out at least one of the following operating steps:

regular acquisition of the values measured by the pressure sensor at time intervals separated by a third acquisition frequency, electronic display of at least one item of information from: the measured pressure, a calculated volume remaining in the receptacle, regular wireless transmission, of the microwave type, at a third transmission frequency of at least one item of information from: the pressure measured at time intervals, an item of autonomy information such as the volume remaining for example, the electronic manometer comprises a specific electric power supply independent of a wire network and it comprises a step of measuring and displaying or transmitting the operating state of the electric power supply, the method comprises a step of comparing the operating state or the autonomy of the electric power supply with minimal conditions and, when the operating state or the autonomy of the electric power supply does not satisfy the minimal conditions, a step of automatic switching of the manometer into an operating state called "degraded" in which the manometer carries out at least one of the following operating steps:

interruption of the regular calculation of a period of autonomy, electronic display of at least one warning message, regular wireless transmission, of the microwave type, of a warning message, the electronic manometer comprises a port or a communication interface capable of receiving configuration data of the electronic unit and the method comprises a step of configuring the electronic unit in order to switch the manometer into a forced operating mode called "inactive" irrespective of the measured values of pressure and if necessary of change in pressure, in the inactive state the manometer interrupting at least one of the following steps:

the acquisition of the values measured by the pressure sensor, the electronic display, the wireless transmission of data, no action while awaiting a reactivation event in order to come out of this inactive state, the electronic manometer comprises a port or a communication interface capable of receiving configuration data of the electronic unit, the method comprising a step of comparing the current operating mode of the receptacle with a plurality of predefined operating modes and it comprises a step of authorizing a change of configuration of the electronic unit only when the operating mode corresponds to one or more predefined operating modes authorizing such a change of configuration, the electronic manometer comprises a sensor of the temperature of the gas inside a receptacle and/or the ambient temperature close to the manometer, the method comprises a step of displaying and/or transmitting the measured temperature value at a fourth transmission frequency, the method comprises a step of calculating a volume of gas autonomy in the receptacle based on the measured pressure, the calculated volume of autonomy being corrected as a function of the measured temperature, the method comprises a step of measuring or calculating the change in measured pressure and a step of comparing the current pressure change with predetermined reference values in order to determine the operating mode and/or to automatically modify the operating mode of the manometer and/or information transmitted by the manometer according to the current pressure change, based on a state of being empty or being filled, when the measured pressure becomes higher than a second high threshold, the manometer is switched to an operating state called full awaiting cooling in which the manometer carries out one or several of the operating steps previously described,

- the information is transmitted by at least one of the systems from: a display screen, one or more light-emitting diodes, an audible warning, a loudspeaker, one or more transmitter radios,
- the first acquisition frequency is higher than or equal to or lower than the second acquisition frequency,
- the first calculation frequency is higher than or lower than or equal to or higher than the second calculation frequency,
- the first transmission frequency is higher than or equal to or lower than the second transmission frequency,
- the third transmission frequency is higher than or equal to (or lower) than the first transmission frequency,
- the fourth transmission frequency is higher than or equal to or lower than the first transmission frequency,
- the source of power comprises at least one of the elements from: a battery, an electric accumulator, a photovoltaic cell, an induction current system,
- the electronic unit automatically switches the manometer from the usage state to the empty or fill state when the measured pressure becomes less than the first low threshold,
- the electronic unit automatically switches the manometer from the state of or fill state to the cooling state when the measured pressure becomes higher than the second high threshold,
- the electronic unit automatically switches the manometer from the fill or cooling state to the usage or standby state when the measured pressure becomes lower than the first high threshold,
- the manometer may comprise a system for recognizing a user or a user type (identifier for example with user type or access level from several predefined types or levels), the manometer authorizing changes of configuration and/or use according to the user or the user type transmitting instruction data,
- the nature of the configuration may be conditional upon one or more identifiers and/or one or more predefined user types (for example an access level or authorization level may or may not authorize the modification of one or more parameters),
- each user of the programming may have a specified identifier comprising an access level,
- the following access levels may be envisaged: manufacturer of the manometer, installer of the manometer on the receptacle, gasman, maintenance operator, (center) filling operator, logistics operator, user of the manometer,
- the electronic unit registers the identifier of a user, particularly a user having made a configuration change.

The invention preferably applies to gas bottles with tap with or without built-in regulators, of the industrial or medical type, onto which an electronic pressure measurement system (electronic manometer) is fitted.

For a further understanding of the nature and objects for the present invention, reference should be made to the detailed description, taken in conjunction with the accompanying figures, in which like elements are given the same or analogous reference numbers.

Figure 1:
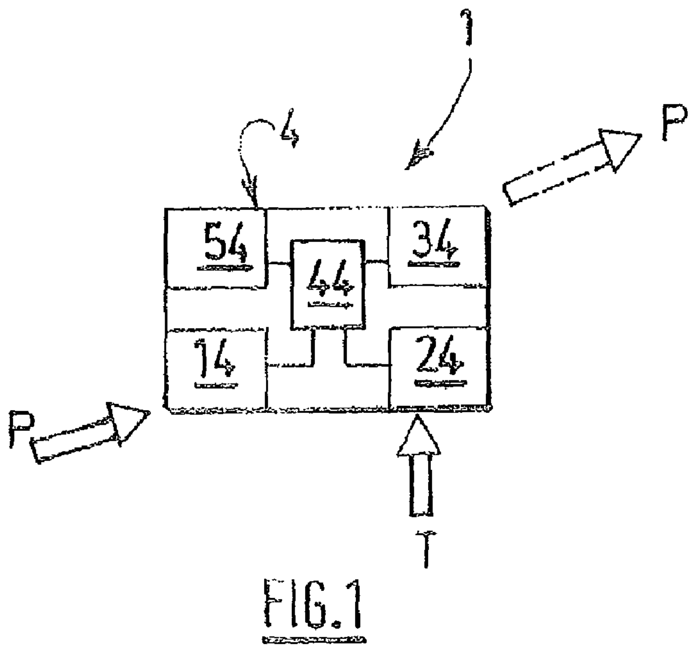
FIG. 1 represents a schematic and partial view illustrating an example of the structure and operation of an electronic manometer according to a possible embodiment of the invention.

As shown in FIG. 1, the electronic manometer may comprise within one and the same casing:

- one or more sensors 14 of pressure P,
- an electronic processing unit 44 (of the micro-processor type for example),
- a system 54 of wireless electric power supply (independent of an outside network) such as a battery, an accumulator, a photovoltaic cell, an induction system or equivalent,
- at least one information and/or communication system 34 comprising for example at least one of the elements from: one or more screens, one or more light-emitting diodes, an audible warning, a loudspeaker, one or more radio transceivers.

The manometer 1 may also comprise at least one of the elements from:

- one or more sensors 24 of temperature T,
- a motion or movement sensor,
- a light sensor or a sound sensor,
- one or more buttons (an input interface),
- a radio receiver.

According to an advantageous particular feature of the invention, the operating mode of the manometer and/or the information delivered by the latter are automatically adapted to the current operating state detected in real time and compared with predefined operating modes. The predefined operating modes are based on a typical cycle of pressure change which the manometer is capable of measuring during a conventional usage cycle of the receptacle.

The usage cycle of a gas bottle may be represented symbolically according to a pressure curve (FIG. 2) or a pressure loop (FIG. 3).

Beginning, for example, with a full gas bottle, it is possible to isolate a first zone A during which the bottle is, for example, at an "end" user.

In this usage zone A, the pressure P measured by the sensor is between a first low threshold S1 and a first high threshold S2 (for example 205 bar). Depending on the need, the user may or may not draw off gas from the bottle in a continuous manner, which lowers the pressure inside (negative pressure change).

Figure 2:
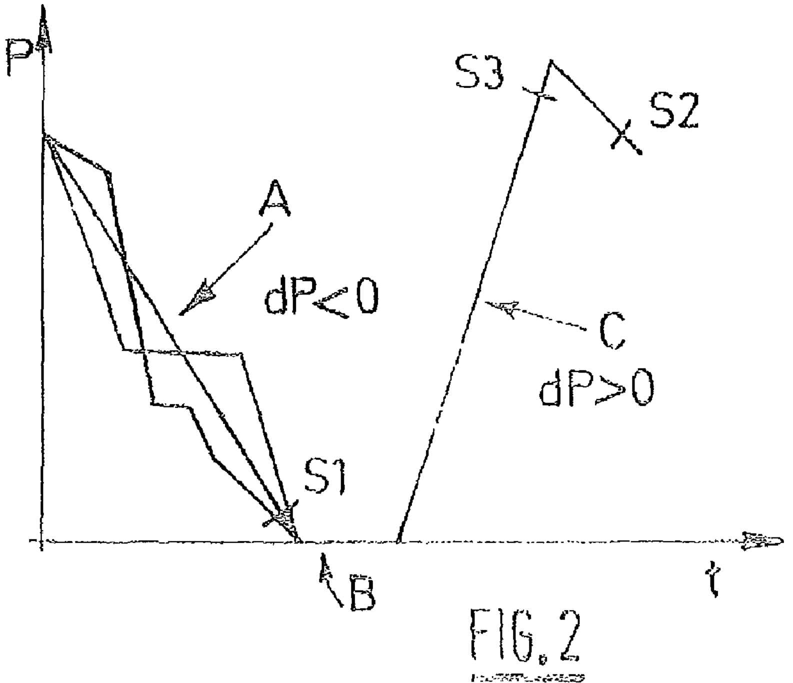

FIG. 2 illustrates various types of pressure drops (a drop that is even and continuous or in several successive slopes). This may correspond to several different flow rates or stages representative of pauses in the flow rate of drawing off.

The manometer exits this first usage state (at the end user or when it is flushed out at the factory before refilling for example) when the pressure measured by the manometer 1 falls below the first low threshold S1 (of the order, for example, of 10 bar or 5 bar).

Then the manometer detects or defines a second state in which the bottle is called "empty" or being refilled.

Thus, when the manometer is in the usage zone A and the measured pressure descends below the first low threshold S1, the manometer detects the transition to a second state, empty or being refilled (zone B-C). The transition from the zone A (usage) to the zone B-C (empty or being refilled) is detected and preferably taken into account even if the measured pressure falls or rises (relative to the low threshold S1) or remains stable.

With reference to FIGS. 2 and 3, the zone B illustrates a bottle that is empty or almost empty, the pressure therein is then zero or almost zero. The bottle is for example either still at the end user or transported or returned to a refilling center of a gasman.

In the next zone C, the bottle is being refilled with compressed gas (positive pressure change). Because of the compression, the gas is heated during this operation (in order to make it comprehensible, in this instance this is simplified in a single straight line).

The manometer detects the exit from this second state (empty or being refilled) when the measured pressure passes above a second high pressure threshold S3 (for example: 210 bar). It should be noted that this second high threshold S3 is not necessarily the highest pressure reached during refilling.

Then, (zone D), refilling is complete, the gas heated up in the previous step will progressively return to ambient temperature. Since the pressure is proportional to the temperature, the measured pressure P will slowly fall back to the nominal pressure of use of the bottle.

Therefore, at the end of refilling and cooling, or at the beginning of the first usage, the apparatus exits the refilling/cooling state when the pressure P returns below the first high threshold S2 (for example: 205 bar).

The cycle A to D can then recommence.

By means of this pressure representation, the manometer 1 can then detect with certainty the use (state) that is in progress and the type of user using the pressurized receptacle.

The system can then adapt the data display and the operation of the manometer to the detected state. For example, the manometer can

- display or automatically transmit the specific information pertinent to the current state
- send or not send warning signals depending on the data but also the operating state.

The behavior of the manometer and the information shown or transmitted to the user may therefore be automatically adapted according to the current context and use, without human intervention via a button, a sensor or another actuator, and this increases the user-friendliness of the system.

Being able to dispense with the above technical means (buttons, sensors, etc.), it is possible to simplify the design and cost of the manometer and to improve its seal and its reliability.

The system therefore proposes a definition of several operating states, the chronology between these states, the transition from one to the other and the detection of the present state of the receptacle the pressure of which is measured.

The system also proposes an adaptation of the behavior of the manometer to the detected state.

This system or method may be applied in a particular and different manner to a multitude of industrial and medical applications.

The electronic unit 44 may therefore comprise stored parameters (which may or may not be reprogrammable) defining various operating states and operating/communication modes (which also may or may not be reprogrammable) specially adapted to these states.

The manometer 1 may comprise a port (radio) or a communication interface capable of receiving in particular configuration/programming data of the electronic unit.

The electronic unit may comprise a stored "inactive" state in which the manometer performs minimal functions for minimal energy consumption. In this inactive state, the display, the acquisition of pressure data, the transmission of data can be disabled. This inactive state may be adopted, for example, via a communication interface or automatically when the state of the electric power supply appears insufficient.

Even if the time interval is reduced between two measurements or two operations carried out by the manometer, the latter can be configured to switch off almost completely, so as not to switch back on until after a time interval (ten seconds for example).

Therefore, the apparatus is almost off during approximately ten or several tens of seconds whereas it is on for only a few tens of milliseconds on each period of use. During the switched-off phase, only the display (in order to prevent blinking) the radio reception and the time counter that determines the reactivation time remain active.

The electronic unit may comprise a stored "standby" state in which the manometer is capable of operating but is not being drawn off. This standby state may correspond to a "substate" of the usage zone A. In this state, the manometer is switched to an operating mode in which, for example, at least one of the following actions are carried out:

- the display of data is activated,
- there is wireless transmission of data (pressure, autonomy, etc.), for example every hour,
- the modification of the stored settings (reprogramming) is possible,
- the acquisition of the measured pressure P data is carried out for example every 30 seconds,
- a display or wireless transmission of the remaining autonomy at the time of the previous use (a function of the pressure and of the volume of the bottle stored or programmed),
- the acquisition of the measured temperature T data is carried out for example every 60 seconds,
- the state of the battery is checked periodically at intervals of less than 24 hours.

The electronic unit may comprise a stored "usage" state (zone A above when the pressure drops). This state may correspond to a second substate of the usage zone A.

In this state, the manometer is in an operating mode in which, for example, at least one of the following actions is carried out:

- the display of data is activated,
- there is wireless transmission of data (pressure, autonomy, etc.), for example every minute,
- the modification of the stored settings (reprogramming) is impossible,
- the acquisition of the measured pressure P data is carried out for example every 10 seconds,
- a calculation of remaining autonomy (a function of the pressure and of the stored or programmed volume of the bottle) is carried out every 10 to 30 seconds and communicated (displayed or sent wirelessly),
- the acquisition of the measured temperature T data is carried out for example every 60 seconds or less,
- the state of the battery is checked periodically at intervals of less than 24 hours.

The electronic unit may also comprise a stored "filling" state (zone C above when the pressure increases) in which, for example, at least one of the following actions is carried out:

- the display of data is activated,
- there is wireless transmission of data (pressure, autonomy, etc.), for example every minute,
- the modification of the stored settings (reprogramming) is possible,
- the acquisition of the measured pressure P data is carried out for example every 10 seconds,
- the acquisition of the measured temperature T data is carried out for example every 60 seconds or less,
- the state of the battery is checked periodically at intervals of less than 24 hours.

In summary, the system can define three loop-linked states:

A: usage,

B-C: empty or being refilled,

D: end of refilling/cooling.

The usage state A may itself be divided into two "substates":

flowing=drawing off=usage, and stopped.

The system may define and detect another independent state of the cycle:

a standby state corresponding, for example, to a storage state (manometer stopped or removed for example).

The system may define and detect yet another independent state of the cycle called "degraded".

The invention is in no way limited to the examples described above. Therefore, the parameters, transmitted information, operating states and modes can be adapted and modified according to all the possible combinations as a function of the needs of an application.

Similarly, the invention relates to a manometer comprising elements for the use of some or all of the functions or steps described above.

The manometer can also be used in particular for measuring the pressure in a duct of a gas network or on removable regulators.

What is claimed is:

1. A method for controlling an electronic manometer for measuring the pressure (P) inside a pressurized gas receptacle, the manometer comprising at least one pressure sensor, an electronic unit designed for the acquisition, storage and processing of data, and at least one information device capable of transmitting at least one item of information (P), the method comprising:

at least one step of measuring the pressure (P) in the receptacle by the pressure sensor, a step of automatic modification of the operating mode of the manometer and/or the information (P) transmitted by the manometer in order to adapt the operating mode or the items of information (P) to the current operating state (A, B-C, D) of the receptacle from a plurality of predefined operating states (A, B-C, D), the operating states (A, B, C, D) being predefined by pre-established reference pressure-threshold values (S1 to S3), the operating states (A, B-C, D) being linked chronologically so as to form a chronological cycle, the modification step being carried out following the detection of a switchover from a first operating state (A, B-C, D) to a second operating state when the pressure values (P) measured during the first operating state and compared with the pre-established reference pressure-threshold values (S1 to S3) correspond to the second operating state and the second operating state is the next in the chronological cycle, wherein the predefined operating states (A, B-C, D) are chronologically linked according to a closed-loop chronological cycle, and in that the manometer is connected to the receptacle and is capable of measuring the pressure within the receptacle throughout the closed-loop chronological cycle.

2. The method of claim 1, wherein the operating states of the closed-loop chronological cycle comprise a state called the usage state during which the gas is capable of being drawn off from the receptacle fitted with the manometer and a state called the filling state during which the receptacle fitted with the manometer is filled with compressed gas.

3. The method of claim 1, wherein the succession of predefined operating states (A, B-C, D) in a closed loop proceeds in a single direction.

4. The method of claim 1, wherein the method comprises one, at least two, and preferably at least three predefined operating states (A, B-C, D).

5. The method of claim 1, wherein the method comprises three operating states (A, B-C, D) predefined by three distinct reference pressure-threshold values (S1 to S3).

6. The method of claim 1, wherein when the measured pressure (P) again descends below a first high threshold (S2) in order then to be between a first low threshold (S1) and said first high threshold (S2), the electronic unit automatically switches the manometer to a usage operating state (A) during which the manometer carries out at least one of the following operating steps:

regular acquisition of the values measured by the pressure sensor at time intervals separated by a first acquisition frequency, electronic display of at least one item of information from: the measured pressure, a calculated volume remaining in the receptacle, a calculated period of autonomy in the receptacle, regular wireless transmission, of the microwave type, at a first transmission frequency, of at least one item of information from: the measured pressure (P), an item of autonomy information (volume or time remaining).

7. The method of claim 6, wherein when, during the usage operating state (A), the measured pressure variation (dP) decreases, the manometer carries out a regular calculation, at a first calculation frequency, of a remaining autonomy time in gas based on the change in measured pressure.

8. The method of claim 6, wherein when during the usage operating state (A), the change in pressure (dP) is zero for a determined period, the electronic unit defines a non-usage or no-flow operating state (A) during which the manometer carries out at least one of the following operating steps:

regular acquisition of the values measured by the pressure sensor at time intervals separated by a second acquisition frequency, calculation of a period of autonomy remaining in gas based on a previous use of the receptacle or on the basis of a typical or standard predefined usage, electronic display of at least one item of information from: the measured pressure, a calculated volume remaining in the receptacle, a calculated period of autonomy in the receptacle, regular wireless transmission, of the microwave type, at a second transmission frequency, of at least one item of information from: the pressure (P) measured at time intervals, an item of autonomy information (volume or time remaining).

9. The method of claim 6, wherein, based on a state of usage, when the measured pressure (P) becomes less than the first low threshold (S1), the electronic unit detects or defines a fill operating state (A) during which the manometer carries out at least one of the following operating steps:

regular acquisition of the values measured by the pressure sensor at time intervals separated by a third acquisition frequency, electronic display of at least one item of information from: the measured pressure, a calculated volume remaining in the receptacle, regular wireless transmission, of the microwave type, at a third transmission frequency of at least one item of information from: the pressure (P) measured at time intervals, an item of autonomy information such as the volume remaining for example.

10. The method of claim 9, wherein when, based on a fill state (A), the measured pressure passes above a second high pressure threshold (S3), the electronic unit automatically switches the manometer to exit the latter state called fill.

11. The method of claim 1, wherein the electronic manometer comprises a specific electric power supply independent of a wire network and in that it comprises a step of measuring and displaying or transmitting the operating state of the electric power supply.

12. The method of claim 11, wherein the method comprises a step of comparing the operating state or the autonomy of the electric power supply with minimal conditions and, when the operating state or the autonomy of the electric power supply does not satisfy the minimal conditions, a step of automatic switching of the manometer into a degraded operating state in which the manometer carries out at least one of the following operating steps:

interruption of the regular calculation of a period of autonomy, electronic display of at least one warning message, regular wireless transmission, of the microwave type, of a warning message.

13. The method of claim 1, wherein the electronic manometer comprises a port or a communication interface capable of receiving configuration data of the electronic unit and in that the method comprises a step of configuring the electronic unit in order to switch the manometer into a forced inactive operating mode irrespective of the measured values of pressure (P) and if necessary of change in pressure (dP), in the inactive state the manometer interrupting at least one of the following steps:

the acquisition of the values measured by the pressure sensor, the electronic display, the wireless transmission of data, no action while awaiting a reactivation event in order to come out of this inactive state.

14. The method of claim 1, wherein the electronic manometer comprises a port or a communication interface capable of receiving configuration data of the electronic unit, the method comprising a step of comparing the current operating mode (A, B-C, D) of the receptacle with a plurality of predefined operating modes and in that it comprises a step of authorizing a change of configuration of the electronic unit only when the operating mode (A, B-C, D) corresponds to one or more predefined operating modes authorizing such a change of configuration.

15. The method of claim 2, wherein the succession of predefined operating states (A, B-C, D) in a closed loop proceeds in a single direction.

16. The method of claim 15, wherein the method comprises one, at least two, and preferably at least three predefined operating states (A, B-C, D).

17. The method of claim 16, wherein the method comprises three operating states (A, B-C, D) predefined by three distinct reference pressure-threshold values (S1 to S3).

18. The method of claim 17, wherein when the measured pressure (P) again descends below a first high threshold (S2) in order then to be between a first low threshold (S1) and said first high threshold (S2), the electronic unit automatically switches the manometer to a usage operating state (A) during which the manometer carries out at least one of the following operating steps:

regular acquisition of the values measured by the pressure sensor at time intervals separated by a first acquisition frequency, electronic display of at least one item of information from: the measured pressure, a calculated volume remaining in the receptacle, a calculated period of autonomy in the receptacle, regular wireless transmission, of the microwave type, at a first transmission frequency, of at least one item of information from: the measured pressure (P), an item of autonomy information (volume or time remaining).

19. The method of claim 18, wherein when, during the usage operating state (A), the measured pressure variation (dP) decreases, the manometer carries out a regular calculation, at a first calculation frequency, of a remaining autonomy time in gas based on the change in measured pressure.

20. The method of claim 19, wherein when during the usage operating state (A), the change in pressure (dP) is zero for a determined period, the electronic unit defines a non-usage or no-flow operating state (A) during which the manometer carries out at least one of the following operating steps:

regular acquisition of the values measured by the pressure sensor at time intervals separated by a second acquisition frequency, calculation of a period of autonomy remaining in gas based on a previous use of the receptacle or on the basis of a typical or standard predefined usage, electronic display of at least one item of information from: the measured pressure, a calculated volume remaining in the receptacle, a calculated period of autonomy in the receptacle, regular wireless transmission, of the microwave type, at a second transmission frequency, of at least one item of information from: the pressure (P) measured at time intervals, an item of autonomy information (volume or time remaining).

21. The method of claim 18, wherein, based on a state of usage, when the measured pressure (P) becomes less than the first low threshold (S1), the electronic unit detects or defines a fill operating state (A) during which the manometer carries out at least one of the following operating steps:

regular acquisition of the values measured by the pressure sensor at time intervals separated by a third acquisition frequency, electronic display of at least one item of information from: the measured pressure, a calculated volume remaining in the receptacle, regular wireless transmission, of the microwave type, at a third transmission frequency of at least one item of information from: the pressure (P) measured at time intervals, an item of autonomy information such as the volume remaining for example.

22. The method of claim 21, wherein when, based on a fill state (A), the measured pressure passes above a second high pressure threshold (S3), the electronic unit automatically switches the manometer to exit the latter state called fill.

23. The method of claim 18, wherein the electronic manometer comprises a specific electric power supply independent of a wire network and in that it comprises a step of measuring and displaying or transmitting the operating state of the electric power supply.

24. The method of claim 18, wherein the method comprises a step of comparing the operating state or the autonomy of the electric power supply with minimal conditions and, when the operating state or the autonomy of the electric power supply does not satisfy the minimal conditions, a step of automatic switching of the manometer into a degraded operating state in which the manometer carries out at least one of the following operating steps:

interruption of the regular calculation of a period of autonomy, electronic display of at least one warning message, regular wireless transmission, of the microwave type, of a warning message.

25. The method of claim 18, wherein the electronic manometer comprises a port or a communication interface capable of receiving configuration data of the electronic unit and in that the method comprises a step of configuring the electronic unit in order to switch the manometer into a forced inactive operating mode irrespective of the measured values of pressure (P) and if necessary of change in pressure (dP), in the inactive state the manometer interrupting at least one of the following steps:

the acquisition of the values measured by the pressure sensor, the electronic display, the wireless transmission of data, no action while awaiting a reactivation event in order to come out of this inactive state.

26. The method of claim 18, wherein the electronic manometer comprises a port or a communication interface capable of receiving configuration data of the electronic unit, the method comprising a step of comparing the current operating mode (A, B-C, D) of the receptacle with a plurality of predefined operating modes and in that it comprises a step of authorizing a change of configuration of the electronic unit only when the operating mode (A, B-C, D) corresponds to one or more predefined operating modes authorizing such a change of configuration.

27. An electronic manometer for measuring the pressure (P) inside a receptacle for applying the method according to claim 1, comprising at least one pressure sensor, an electronic unit designed for the acquisition, storage and processing of data, at least one information device capable of transmitting at least one item of information (P), wherein the electronic data processing unit is designed to receive the pressure values (P) measured by the pressure sensor and comprises logic for comparing the measured pressure (P) and measured pressure change (dP) values with pre-established or stored respective reference values, the electronic data processing unit storing at least two operating states (A, B, C, D) of the receptacle representative respectively of a state of fill of the receptacle when the pressure change is positive and a state of tapping off (negative pressure change), as a function of the measured pressure (P) and measured pressure change (dP) values relative to the pre-established pressure and pressure change reference values, and in that the electronic data processing unit is designed to automatically change the operation and/or the nature of the information transmitted by the manometer as a function of the operating state (A, B-C, D) of the receptacle that is determined in real time based on the measured pressure (P) and pressure change (dP) values.

* * * * *